(12) United States Patent
Feldhaus et al.

(10) Patent No.: US 6,814,205 B2
(45) Date of Patent: Nov. 9, 2004

(54) MULTI-DISK CLUTCH ARRANGEMENT

(75) Inventors: Reinhard Feldhaus, Niederwerrn (DE); Markus Heiartz, Würzburg (DE); Andreas Orlamünder, Schweinfurt (DE); Jochen Kuhstrebe, Biebelried/Westheim (DE); Wolfgang Reisser, Sennfeld (DE); Thomas Wirth, Schwanfeld (DE); Michael Peterseim, Oberdorla (DE); Jürgen Dudenhöffer, Herbstadt (DE); Manfred Zimmer, Zeil (DE)

(73) Assignee: ZF Sachs AG, Schweinfurt (DE)

( * ) Notice: Subject to any disclaimer, the term of this patent is extended or adjusted under 35 U.S.C. 154(b) by 6 days.

(21) Appl. No.: 10/266,109

(22) Filed: Oct. 7, 2002

(65) Prior Publication Data

US 2003/0164275 A1 Sep. 4, 2003

(30) Foreign Application Priority Data

Oct. 9, 2001 (DE) ......................................... 101 49 710

(51) Int. Cl.$^7$ ............................................... B60K 25/00
(52) U.S. Cl. ................................. 192/48.9; 192/113.31; 180/53.8; 180/165; 310/54; 310/64
(58) Field of Search ............................. 192/48.9, 113.1, 192/113.22, 113.3, 113.31, 48.91, 48.7; 310/52, 54, 64; 180/53.8, 165

(56) References Cited

U.S. PATENT DOCUMENTS

| | | | | |
|---|---|---|---|---|
| 4,958,095 A | * | 9/1990 | Uchida et al. | 310/59 |
| 6,388,348 B2 | * | 5/2002 | van Heyden et al. | 310/74 |
| 6,531,795 B2 | * | 3/2003 | Weimer | 310/53 |
| 6,561,336 B1 | * | 5/2003 | Huart et al. | 192/70.25 |
| 6,668,953 B1 | * | 12/2003 | Reik et al. | 180/53.8 |

* cited by examiner

Primary Examiner—Saul Rodriguez
(74) Attorney, Agent, or Firm—Cohen, Pontani, Lieberman & Pavane

(57) ABSTRACT

A dual clutch arrangement including two clutch areas, each with a pressure plate connected to a housing arrangement for rotation in common around an axis of rotation (A) and which can be shifted in the axial direction with respect to the housing; and a clutch disk, the friction surface areas of which can be clamped between the respective pressure plate and an opposing support arrangement. Each of the clutch disks is designed to be connected nonrotatably to a different power takeoff element. In addition a clutch cooling arrangement, through which a coolant can flow, is installed adjacent to the clutch areas.

3 Claims, 2 Drawing Sheets

MULTI-DISK CLUTCH ARRANGEMENT

BACKGROUND OF THE INVENTION

1. Field of the Invention

The present invention pertains to a multi-disk clutch arrangement, especially to a dual clutch arrangement comprising at least two clutch areas, each with a pressure plate which is connected to a housing for rotation in common around an axis of rotation and which can be shifted in the axial direction with respect to the housing and a clutch disk, the friction surface arrangement of which can be clamped between the pressure plate and an opposing support arrangement, where each of the clutch disk is designed to be connected nonrotatably to a different power takeoff element.

2. Description of the Related Art

Multi-disk clutch arrangements of this type are frequently used as clutches for so-called load-switching transmissions, in which the path along which the torque is transmitted alternates between two different transmission input shafts, which are usually concentric to each other. To avoid interruptions in the tractive force as effectively as possible during the performance of the switching or clutching operations, operating phases with slip occur, during which a considerable amount of frictional heat is generated in the clutch arrangement.

SUMMARY OF THE INVENTION

The task of the present invention is to design a multi-disk clutch arrangement in such a way that the heat generated during the operation of the clutch can be dissipated effectively.

According to a first aspect of the present invention, a clutch cooling arrangement, through which a coolant can flow, is installed adjacent to the clutch arrangement.

By providing a cooling arrangement, through which a coolant flows, in the area adjacent to the clutch arrangement, it is ensured that heat will not concentrate, and that the heat caused essentially by friction can be carried rapidly away. The areas subjected to severe thermal stress are therefore relieved, which means that the overall service life of a clutch arrangement of this type can be prolonged.

It is possible, for example, for the cooling arrangement to be installed so that it surrounds at least a certain area of the housing radially on the outside.

So that various components of the system can be made to do double duty, it is proposed that the cooling arrangement form a part of an electric machine designed to introduce torque and/or to recover electrical energy. Heat which must be carried away is also generated during operations with systems of this type, which are also known as starter/generator units, and which are able to supply the torque required to start an internal combustion engine and to supply supplemental torque which can be used during the operation of the engine, and which can then convert kinetic energy into electrical energy once the internal combustion engine is running. The cooling arrangement to be provided according to the invention can therefore be used both to carry away heat from the area of the clutch arrangement and also to carry away heat from the area of the electric machine.

It is possible, for example, for the electric machine to have a stator area, supported on a carrier and surrounding the axis of rotation, and a rotor area, which is connected to the housing arrangement for rotation in common and rotates with respect to the stator area, and for the cooling arrangement to form at least a part of the carrier of the stator area.

So that a good heat-conducting connection with both the electric machine and the clutch arrangement can be obtained, it is possible in accordance with another advantageous aspect of the invention to provide a rotor interaction area, which surrounds a stator interaction area radially on the outside.

The carrier can include a ring-shaped body with a U-shaped cross section, where the rotor interaction area and the stator interaction area are surrounded essentially by the U-shaped profile of the ring-shaped body.

To improve the effectiveness with which the heat is dissipated even more, it is proposed that the cooling arrangement have a preferably rib-like surface structure on the side facing the housing arrangement.

The heat generated in the area of the thermally stressed components, that is, in particular in the area of the opposing support arrangement, can be dissipated even more effectively by designing the opposing support arrangements of the two clutch areas situated next to each other in the direction of the axis of rotation so that they are formed essentially by ring-shaped opposing support areas, in which at least one channel-like air pass-through opening is provided.

According to another aspect of the present invention, the opposing support arrangements of the two clutch areas situated next to each other in the direction of the axis of rotation are formed essentially by ring-shaped opposing support areas, in which at least one channel-like air pass-through opening is provided.

So that centrifugal force can be used efficiently to circulate the air, it is proposed that the minimum of one air pass-through opening be open to a radially interior side of the ring-shaped opposing support area. Another advantage of this arrangement is that the surfaces available for frictional interaction, which usually extend in the axial direction, and are not affected by any openings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
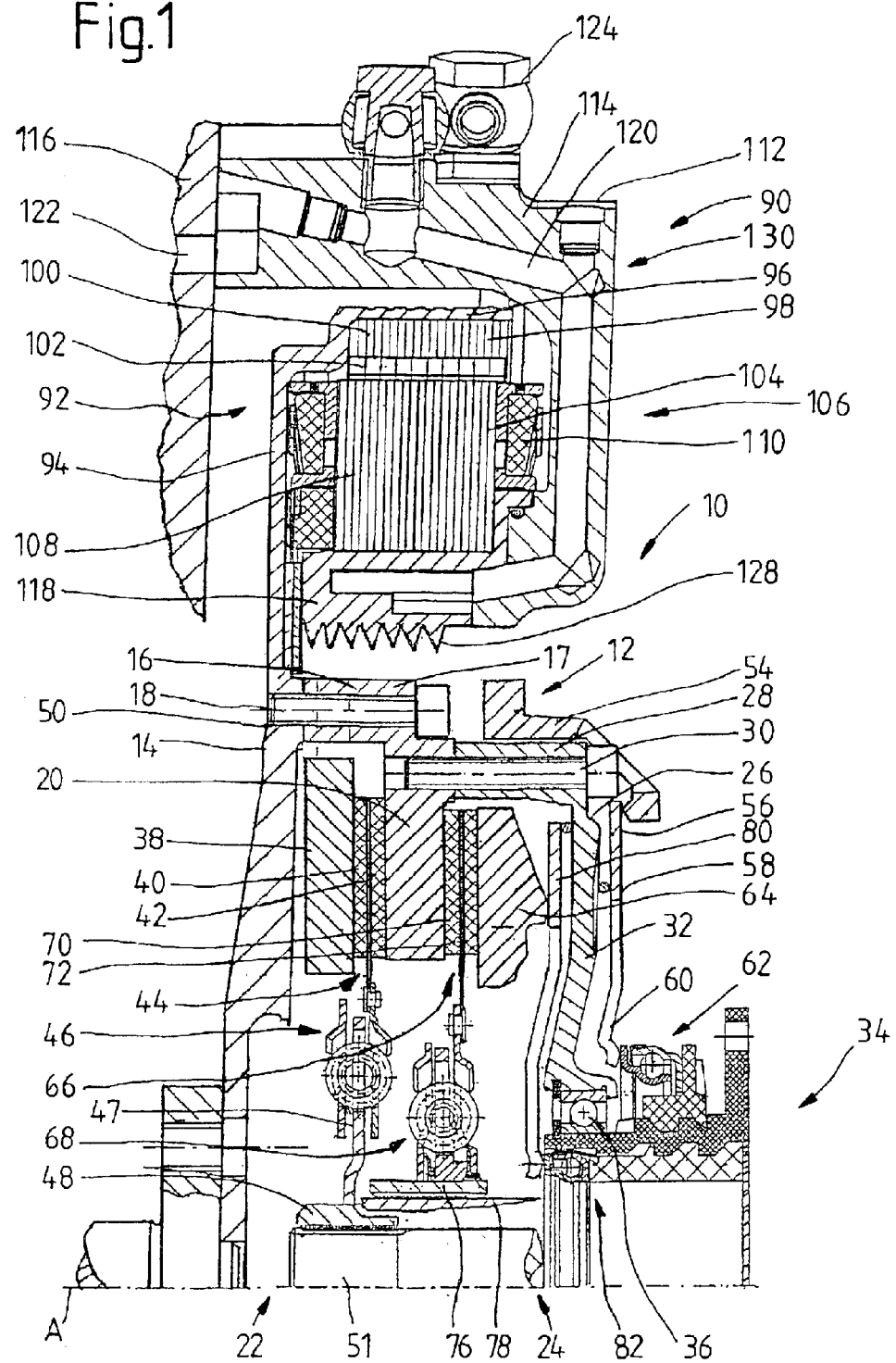
FIG. 1 shows a partial longitudinal cross section through a clutch arrangement according to the invention.

FIG. 1 shows a first embodiment of a dual clutch 10. This dual clutch 10 has a housing 12, which is made up of several parts. A disk-like part 14, which can be designed as a flywheel, as a secondary mass of a dual-mass flywheel, or as a driver plate, etc., has the job of connecting the dual clutch 10 to a drive shaft such as a crankshaft of an internal combustion engine for rotation in common. A radially outer section 17, extending essentially in the axial direction, of a housing part 16 is connected to the disk-like part 14 by a plurality of threaded bolts 18. The radially inward-extending, ring-shaped section 20 of the housing part 16 forms an opposing support area for the two clutch areas 22, 24 of the dual clutch 10, which will be described in greater detail below. Another housing part 26 is rigidly connected by its radially outer section 28, which also extends essentially in the axial direction, to the housing part 16 by a plurality of threaded bolts 30. A radially inward-projecting, ring-shaped section 32 of the housing part 26 serves to support the housing, i.e., to support it with freedom of rotation, on an actuating mechanism 34 by way of a bearing 36.

The first clutch area 22 of the dual clutch 10 comprises a pressure plate 38, which is installed on one axial side of the opposing support area 20, which is attached to the housing arrangement 12 or is formed by it. The friction surface arrangement 44, comprising friction linings 40, 42 of a clutch disk 46 of the first clutch area 22, is situated between this pressure plate 38 and the opposing support area 20. In the exemplary embodiment shown, the clutch disk 46 is designed with a torsional vibration damper 47. In its radially inner area, the clutch disk 46 is designed to be connected by its hub 48 nonrotatably to a first power takeoff shaft or transmission input shaft 51.

In its radially outer area, the pressure plate 38 has radial projections 50 at several circumferential positions, which pass radially through corresponding openings in the housing part 16 with circumferential play. These projections 50 are rigidly connected by tension rods 52 to an actuating element 54 with, for example, a ring-shaped design. The actuating element 54 is acted upon by a radially outer area 56 of an actuating force-transmitting element 58. This element is supported in its radially middle area on the outside of the section 32 of the housing part 26, and in its radially inner area 60 is acted upon by an actuating area 62 of the actuating mechanism 34. The actuating force-transmitting element 58 can be designed as a diaphragm spring, for example, but it can also comprise a force-transmitting lever arrangement with several lever elements distributed around the circumference.

The second clutch area 24 has a pressure plate 64 on the other axial side of the opposing support area 20. The friction surface arrangement 66, with its friction linings 70, 72, of the clutch disk 68 of the second clutch area 24 is situated between the pressure plate 64 and the opposing support area 20. In the exemplary embodiment shown here, the clutch disk 68 also has a torsional vibration damper 74. In its radially inner area, the clutch disk 68 is designed to be connected nonrotatably via its hub 76 to a second transmission input shaft 78, which is essentially concentric to the first transmission input shaft 51.

An actuating force transmitting element 80 of the second clutch area 24 is supported radially on the outside on the housing part 26 and acts in its radially middle area on the pressure plate 64. Radially on the inside, the actuating force-transmitting element 80 is designed to be acted upon by an actuating area 82 of the actuating mechanism 34. The actuating force-transmitting element 80 can also be designed as a diaphragm spring or as a lever arrangement.

The dual clutch arrangement 10 shown here is of the normally-open type. When, therefore, the two actuating areas 62, 82 of the actuating mechanism 34 act on the various actuating force-transmitting elements 58, 80, a clutch-engaging force is produced, which pushes the pressure plates 38, 64 toward the opposing support area 20.

The pressure plates 38, 64 can be connected to the housing arrangement 12 for rotation in common by means of, for example, tangential leaf springs, which can have connecting areas for the pressure plates 38, 64 on one side and connecting areas for the housing arrangement 12 on the other side, these areas being offset axially with respect to each other to obtain a self-reinforcing effect.

The housing arrangement 12 of the dual clutch 10 is surrounded by an electric machine 90, which is also known as a crankshaft starter/generator. This electric machine 90 comprises a rotor area 92 with a rotor carrier 94, which, in the example shown, is designed as an integral part of the housing part 14, but which could obviously also be a separate component, which is fastened to the housing arrangement 12 for rotation in common. The radially outer, approximately cylindrical section 96 of the rotor carrier 94 carries a rotor interaction area 98. This comprises a package of metal plates 100, which act as a yoke for the permanent magnets 102 distributed around the circumference. Radially on the outside, this rotor interaction area 98 surrounds a stator interaction area, designated 104 overall, of a stator area 106. The stator interaction area 104 also comprises several metal plates 108 positioned next to each other, which act as a yoke for the current-carrying windings 110.

The stator interaction area 104 is mounted on a stator carrier 112. This has a component 114, which is attached by its radially outer area to an engine block 116 or the like and which, in its radially inner area, is rigidly connected to a ring-shaped component 118, which directly supports the stator interaction area 104. The two parts 114, 118 form a ring-shaped body with an approximately U-shaped cross section, where the U-shaped cross section essentially surrounds three sides of the rotor interaction area 98 and the stator interaction area 104 situated inside it.

A coolant channel arrangement 120 is provided inside the stator carrier 112. This arrangement can be connected to an engine coolant system, indicated by an outlet 122. A connecting area 124 for connection of the coolant channel arrangement 120 to an external coolant supply system can also be provided, however.

During operation, a coolant, such as cooling water, flows through the coolant channel system. The result is that the entire stator carrier 112 and thus also the system components in heat exchange with it are cooled. This includes primarily the stator interaction area 104, in which a considerable amount of heat is generated because of the current which flows through it. Because of the temperature gradient which is present, however, the housing arrangement 12, i.e., the entire area of the dual clutch 10, which is also subject to the effect of heat, experiences improved cooling as a result of the lowering of the temperature in the area of the stator carrier 112. To improve the cooling interaction even more, the stator carrier 112 is provided on its side facing the housing arrangement 12 of the dual clutch 10, especially on the radially inner surface of the component 118, with a ribbed structure 128, which increases the area of the surface available for heat exchange.

Thanks to the cooling system provided essentially by the channel arrangement 120 inside the stator carrier 112, a very advantageous double action is obtained in the system shown in FIG. 1. First, the area of the electric machine 90 subjected to the greatest thermal stress, namely, the stator area 106, is cooled. Second, the area of the dual clutch 10 which is also subjected to very severe thermal stress, especially during the execution of switching operations, is cooled. Thus the operational reliability is increased, and it is also ensured that the various system components will have a longer service life.

Figure 2:
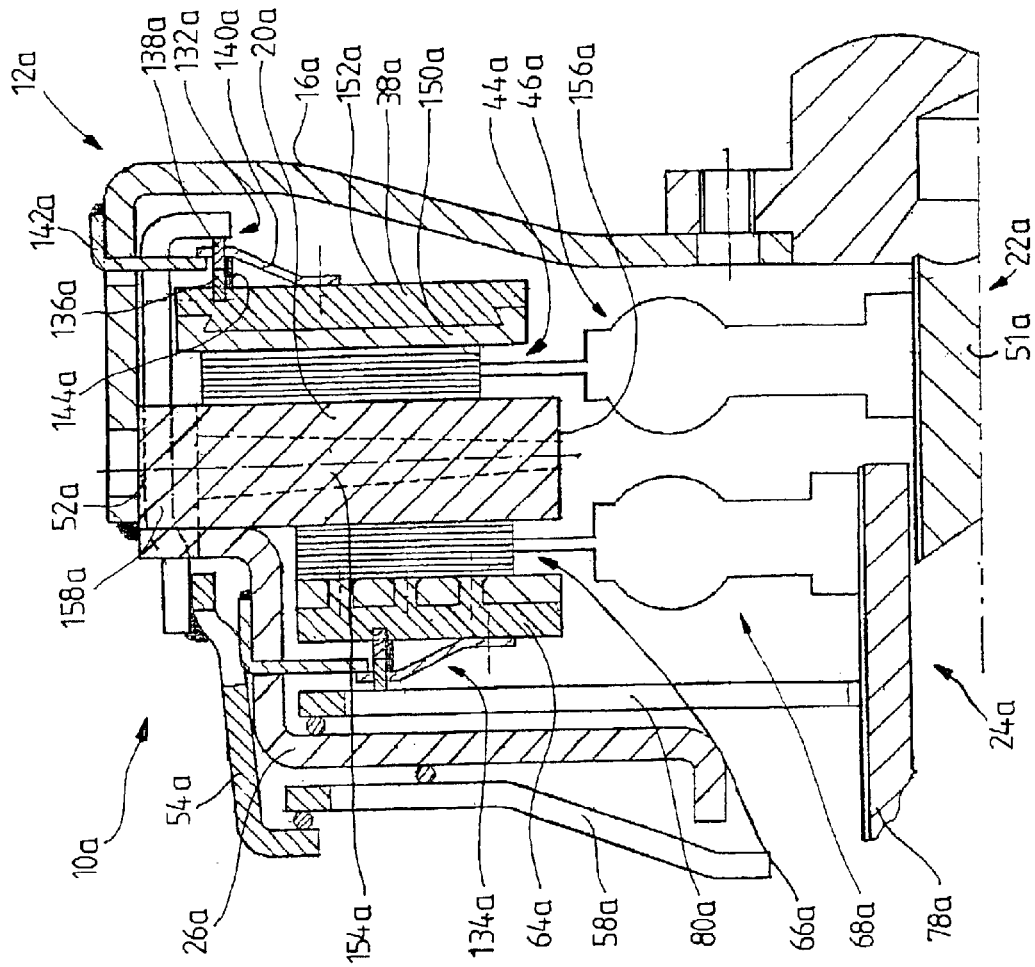
FIG. 2 shows a partial longitudinal cross section through an alternative embodiment of a clutch arrangement according to the invention.

FIG. 2 shows an alternative embodiment of a dual clutch according to the invention. Components which correspond to those previously described with respect to their design or function are designated by the same reference numbers with the addition of an "a".

The design and function of the dual clutch shown in FIG. 2 are basically the same as described above. It can be seen in FIG. 2, however, that slight differences are present in the design. For example, the housing part 16 is extended radially toward the inside and thus also ultimately comprises the housing part 14 shown in FIG. 1, via which the connection to the crankshaft can be accomplished. The ring-shaped, disk-like opposing support area 20a is connected to this housing part 16a by welds, for example. The housing part 26a can also be welded to this assembly, if desired. The actuating element 54a is connected to a plurality of tension rods 52a, visible in FIG. 2, which transmit the actuating force to the pressure plate 38a of the first clutch area 22a. In addition, a wear-compensating device 132a, 134a is assigned to each clutch area; in the example shown, the two wear-compensating devices 132a, 134a are of the same design. A brief description of the basic function of these devices is given below with reference to the wear-compensating device 132a.

The wear-compensating device 132a comprises two ring-shaped adjusting elements 136a, 138a. The surfaces of these elements which rest against each other have complementary ramps, so that the relative rotation of the two adjusting rings 136a, 138a which occurs with respect to each other under the pretension of a spring leads to an increase in the overall axial dimension of these two components. A leaf spring element 140a attached to the pressure plate 38a extends over the adjusting ring 138a and presses it together with the adjusting ring 136a against the pressure plate 38a. Thus the relative rotation mentioned above, which occurs under the pretensioning force, cannot normally occur. A blocking element 142a is attached to the housing arrangement 12a. This element projects radially inward and overlaps the free end of the leaf spring element 140a. When wear occurs, the pressure plate 38a moves closer to the opposing support area 20a in the diagram of FIG. 2. The result of this is that the leaf spring element 140a makes contact with the blocking element 142a, and thus its radially outer area can no longer accompany this displacement. When wear occurs, therefore, the leaf spring element 140a is lifted slightly from the adjusting ring 138a. A wedge-shaped slider 144a, which is also under a pretensioning force, moves into the intermediate space between the pressure plate 38a and the leaf spring element 140a when this space has become larger as a result of wear. When a clutch-release operation is performed and the force being exerted by the tension rods 52a is released, the slider thus prevents the leaf spring element 140a from coming into contact with the adjusting ring 138 again when the pressure plate 38a executes the release movement. Instead, because no force is being exerted on it, either by the tension rods 52a or by the leaf spring element 140a, the adjusting ring 136a is able to rotate in the circumferential direction, so that the previously discussed increase in the axial dimension of the wear-compensating device 132a, consisting essentially of the two adjusting rings 136a, 138a, can occur.

The increased axial dimension then compensates essentially for the wear which has occurred and which has been registered by the interaction between the blocking element 142a and the leaf spring element 140a.

Another difference in the design is that, as can also be seen in FIG. 2, the two pressure plates 38a, 64a are built up of several layers. For example, it is possible for a layer 150a, constituting essentially of the frictional interaction surface, to have a smaller coefficient of thermal expansion than a layer 152a farther away from the friction surface, i.e., from the friction lining of the associated clutch disk. Under the effect of the heat produced by friction, the area near the friction lining is heated to a higher temperature that the area farther away from the lining is heated. Because of the low coefficient of thermal expansion, however, it can be ensured that approximately the same degree of thermal expansion will occur both in the area near the friction lining and in the area farther way from it. This avoids the danger of deformation, which could cause pressure plate 38a or in a corresponding manner pressure plate 64a to form a dome. Gray cast iron or particle-reinforced aluminum, such as the material known under the trade name "Duralcan" can be used for the layer 150a. Aluminum or an aluminum alloy can be used for the layer 152a.

It can also be seen in the embodiment according to FIG. 2 that cooling air channels 154a are provided in the opposing support area 20a, which is designed as a ring-shaped disk. These extend from a radially inner end surface 156a of the ring-shaped disk-like opposing support area 20a radially toward the outside, where they open radially toward the outside, for example, or into an open area 158a connecting the two axial sides. The channels 154a thus ensure that the centrifugal forces which develop during rotational operation help to convey the air radially outward from the inside. The opposing support area 20a, which is subjected to heat on both sides, is thus cooled more effectively. It is obvious that this type of cooling can be combined with the installation of the supplemental cooling arrangement shown in FIG. 1. It should also be pointed out that various areas of the system of the clutch arrangement can obviously be designed in a manner different from that presented here. This pertains in particular, for example, to the wear-compensating devices, to the clutch disks, to the actuating mechanism, to the manner in which the force is transmitted between the actuating mechanism and the pressure plates, etc.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A multi-clutch arrangement comprising
   a housing,
   a pair of pressure plates connected to said housing for rotation in common about an axis of rotation and which can be shifted axially with respect to said housing,
   an opposing support arranged between said pressure plates,
   a pair of clutch disks having friction surfaces which can be clamped between said opposing support and respective said pressure plates, each said clutch disk being connectable nonrotatably to a respective power takeoff element, a clutch cooling arrangement through which a coolant can flow, said clutch cooling arrangement surrounding said housing adjacent to said pressure plates, said opposing support, and said clutch disks, and an electric machine for introducing torque and recovering electrical energy, said electric machine comprising a stator surrounding said axis of rotation, said stator comprising a stator interaction area;

a rotor which is connected to the housing for rotation in common, and which is free to rotate relative to the stator, the rotor having a rotor interaction area surrounding the stator interaction area radially on the outside; and a carrier on which said stator is mounted, said cooling arrangement forming at least part of the carrier, said carrier comprising a ring-shaped body having a U-shaped cross-section, said stator interaction area and said rotor interaction area being accommodated in said U-shaped cross-section.

2. A multi-clutch arrangement as in claim 1 wherein said cooling arrangement has a ribbed surface structure facing said housing.

3. A multi-clutch arrangement as in claim 1 wherein said opposing support is a ring-shaped member having at least one air channel therein.

* * * * *